(12) United States Patent
Du et al.

(10) Patent No.: US 10,885,639 B2
(45) Date of Patent: Jan. 5, 2021

(54) HAND DETECTION AND TRACKING METHOD AND DEVICE

(71) Applicant: Advanced New Technologies Co., Ltd., Grand Cayman (KY)

(72) Inventors: Zhijun Du, Hangzhou (CN); Nan Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/721,449

(22) Filed: Dec. 19, 2019

(65) Prior Publication Data

US 2020/0134838 A1   Apr. 30, 2020

Related U.S. Application Data

(63) Continuation of application No. 16/229,810, filed on Dec. 21, 2018, which is a continuation of application No. PCT/CN2017/087658, filed on Jun. 9, 2017.

(30) Foreign Application Priority Data

Jun. 23, 2016   (CN) .......................... 2016 1 0461515

(51) Int. Cl.
  *G06K 9/00*   (2006.01)
  *G06T 7/231*   (2017.01)
  (Continued)

(52) U.S. Cl.
  CPC .......... *G06T 7/231* (2017.01); *G06K 9/00375* (2013.01); *G06K 9/6202* (2013.01);
  (Continued)

(58) Field of Classification Search
  None
  See application file for complete search history.

(56) References Cited

U.S. PATENT DOCUMENTS

7,844,921 B2   11/2010   Ike et al.
8,644,556 B2   2/2014   Zhou et al.
(Continued)

FOREIGN PATENT DOCUMENTS

CN   102831439   12/2012
CN   103376890   10/2013
(Continued)

OTHER PUBLICATIONS

Liu Ni ; Muhammad Ali Abdul Aziz, A robust deep belief network-based approach for recognizing dynamic hand gestures, Mar. 10, 2016, IEEE: 2016 13th International Bhurban Conference on Applied Sciences and Technology (IBCAST), pp. 199-205 (Year: 2016).*
(Continued)

*Primary Examiner* — Atiba O Fitzpatrick
(74) *Attorney, Agent, or Firm* — Fish & Richardson P.C.

(57) ABSTRACT

For each frame of a video, a determination is made whether an image of a hand exists in the frame. When at least one frame of the video includes the image of the hand, locations of the hand in the frames of the video are tracked to obtain a tracking result. A verification is performed to determine whether the tracking result is valid in a current frame of the frames of the video. When the tracking result is valid in the current frame of the video, a location of the hand is tracked in a next frame. When the tracking result is not valid in the current frame, localized hand image detection is performed on the current frame.

16 Claims, 12 Drawing Sheets

(51) Int. Cl.
*G06T 7/246* (2017.01)
*G06K 9/62* (2006.01)

(52) U.S. Cl.
CPC ............ *G06K 9/6284* (2013.01); *G06T 7/248* (2017.01); *G06T 2207/10016* (2013.01); *G06T 2207/20072* (2013.01); *G06T 2207/20081* (2013.01); *G06T 2207/20084* (2013.01); *G06T 2207/30196* (2013.01)

(56) References Cited

U.S. PATENT DOCUMENTS

| | | | |
|---|---|---|---|
| 2013/0272570 | A1 | 10/2013 | Sheng et al. |
| 2014/0363088 | A1 | 12/2014 | Cha et al. |
| 2017/0068853 | A1* | 3/2017 | Klement ............ G06K 9/00208 |
| 2019/0188865 | A1 | 6/2019 | Du et al. |

FOREIGN PATENT DOCUMENTS

| | | |
|---|---|---|
| CN | 104731323 | 6/2015 |
| CN | 104821010 | 8/2015 |
| JP | 2008052590 | 3/2008 |
| JP | 2010039788 | 2/2010 |
| JP | 2012098771 | 5/2012 |
| JP | 2012203439 | 10/2012 |
| JP | 2014119295 | 6/2014 |
| JP | 2015230715 | 12/2015 |
| JP | 2016014954 | 1/2016 |
| JP | 2016015116 | 1/2016 |
| TW | 201201090 | 1/2012 |
| TW | I397840 | 6/2013 |
| TW | I499966 | 9/2015 |
| WO | WO 2014200714 | 12/2014 |
| WO | WO 2016077000 | 5/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.

European Extended Search Report in European Patent Application No. 17814613.0, dated May 10, 2019, 8 pages.

Guo et al., "Real-time hand detection based on multi-stage HOG-SVM classifier," 2013 IEEE International Conference on Image Processing, 2013, pp. 4108-4111.

International Preliminary Report on Patentability in International Application No. PCT/CN2017/087658, dated Dec. 25, 2018, 7 pages (with English Translation).

International Search Report by the International Searching Authority issued in International Application No. PCT/CN2017/087658 dated Aug. 30, 2017; 9 pages.

Nakamoto, "Bitcoin: A Peer-to-Peer Electronic Cash System," www.bitcoin.org, 2005, 9 pages.

Ike et al., "Robust Hand Tracking for Hand-Motion-Based Gesture UI", The 18th Symposium on Sensing via Image Information, Jun. 2012, 9 pages (with partial English translation).

* cited by examiner

HAND DETECTION AND TRACKING METHOD AND DEVICE

CROSS-REFERENCE TO RELATED APPLICATIONS

This application is a continuation of U.S. patent application Ser. No. 16/229,810, filed on Dec. 21, 2018, which is a continuation of PCT Application No. PCT/CN2017/087658, filed on Jun. 9, 2017, which claims priority to Chinese Patent Application No. 201610461515.0, filed on Jun. 23, 2016, and each application is hereby incorporated by reference in its entirety.

TECHNICAL FIELD

The present disclosure relates to the field of visual target detection and tracking technologies and human-computer interaction technologies, and specifically, to a hand detection and tracking method and device.

BACKGROUND

Hands can be used as a human-computer interaction tool. In practice, hands need to be detected and tracked in real time to obtain locations of the hands in each frame of a video through human-computer interaction processes. Specifically, detection can be performed in each frame, but the detection is time-consuming and cannot be performed in real time. In addition, erroneous detection occasionally occurs and causes jittering of hand locations, which can affect subsequent user interaction.

To solve the previous problems, a tracking mechanism is introduced in the existing technology to achieve a real-time effect. However, a target can get lost during tracking. To alleviate the issue of losing the tracking target, a method commonly used in the existing technology is to introduce skin color information. Although some erroneous tracking can be avoided by using skin color, a tracking error can still be made when the background color and the skin color are similar.

SUMMARY

Implementations of the present application provide a hand detection and tracking method, including the following: performing hand detection in each frame of image; when a hand is detected in a frame of image, performing location tracking on the detected hand to obtain a tracking result; and verifying whether the tracking result is valid, to track the hand in a next frame or perform localized hand detection in the current frame based on the tracking result.

The implementations of the present application further provide a hand detection and tracking device, including the following: a hand detection unit, configured to perform hand detection in each frame of image; a location tracking unit, configured to perform location tracking on a detected hand to obtain a tracking result when the hand is detected in a frame of image; and a tracking result processing unit, configured to verify whether the tracking result is valid, to track the hand in a next frame or perform localized hand detection in the current frame based on the tracking result.

In the implementations of the present application, a verification step is added during tracking, so that a tracking result can be corrected in real time, thereby ensuring quick and accurate hand detection.

Certainly, any product or method that implements the present application can achieve part of instead of all the previous advantages.

BRIEF DESCRIPTION OF DRAWINGS

To describe the technical solutions in the implementations of the present disclosure or in the existing technology more clearly, the following briefly describes the accompanying drawings needed for describing the implementations or the existing technology. Apparently, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following clearly and comprehensively describes the technical solutions in the implementations of the present disclosure with reference to the accompanying drawings in the implementations of the present disclosure. Apparently, the described implementations are merely some rather than all of the implementations of the present disclosure. All other implementations obtained by a person of ordinary skill in the art based on the implementations of the present disclosure without creative efforts shall fall within the protection scope of the present disclosure.

Figure 1:
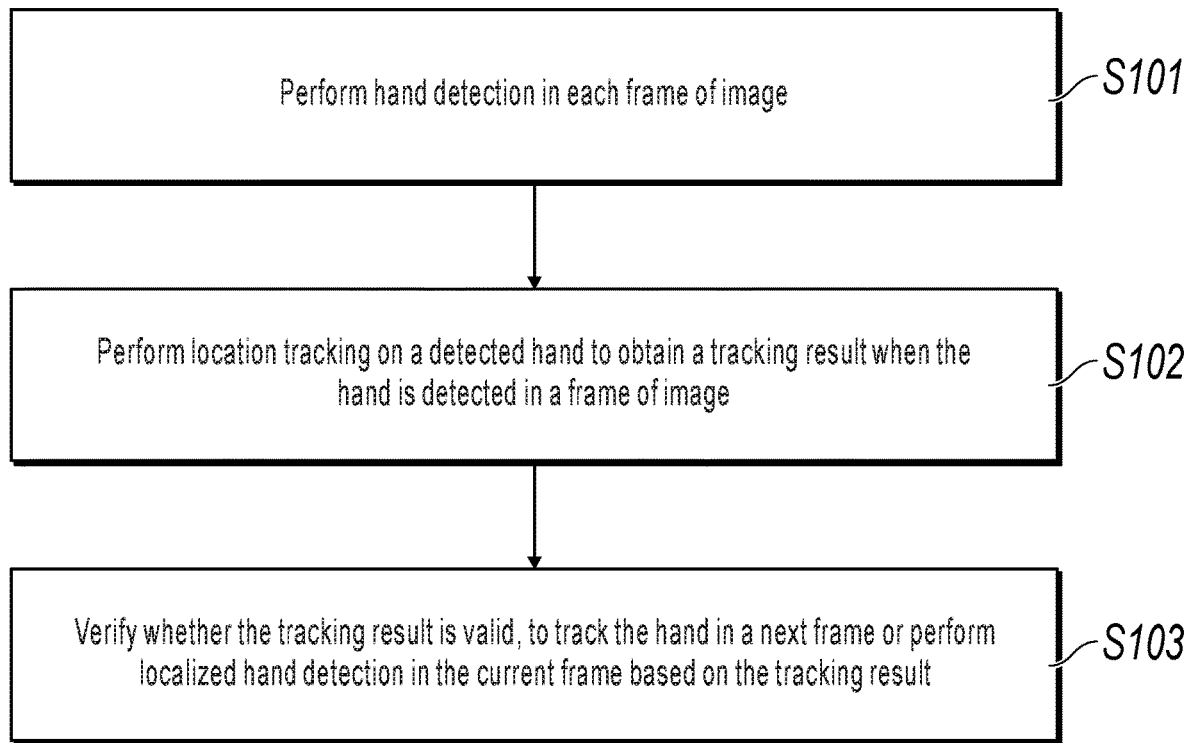
FIG. 1 is a method flowchart illustrating an implementation of a hand detection and tracking method, according to an implementation of the present application.

A hand detection and tracking method and device in the present application are described below in detail with reference to the accompanying drawings. FIG. 1 is a method flowchart illustrating an implementation of a hand detection and tracking method, according to the present application. Although the present application provides method operation steps or device structures shown in the following implementations or accompanying drawings, conventionally or without creative efforts, the method can include more or fewer operation steps, or the device can include more or fewer module structures. For steps or structures not necessarily bound to logical causality, an execution sequence of these steps or a module structure of the device is not limited to the execution sequence or module structure provided in the implementations of the present application. When applied to an actual device or terminal product, the method or module structure can be executed in a sequence based on the method or module structure connection shown in the implementations or accompanying drawings or can be executed in parallel (for example, an environment of parallel processors or multi-thread processors).

Base on a problem of existing technology that a detected hand usually goes missing during tracking, a tracking verification mechanism is introduced in the present application, so that a tracking result can be corrected in real time, thereby ensuring quick and accurate hand detection. Specifically, as shown in FIG. 1, the hand detection and tracking method in the present application can include the following steps:

S101. Perform hand detection in each frame of image.

S102. Perform location tracking on a detected hand to obtain a tracking result when the hand is detected in a frame of image.

S103. Verify whether the tracking result is valid, to track the hand in a next frame or perform localized hand detection in the current frame based on the tracking result.

It can be seen from the procedure shown in FIG. 1 that in the present application, hand detection is first performed, location tracking is performed when the hand is detected, and validity of the tracking result is verified, so that an invalid tracking result can be corrected to avoid making an erroneous decision. Therefore, hand detection can be performed quickly and accurately, and a calculation amount can be reduced.

Figure 2:
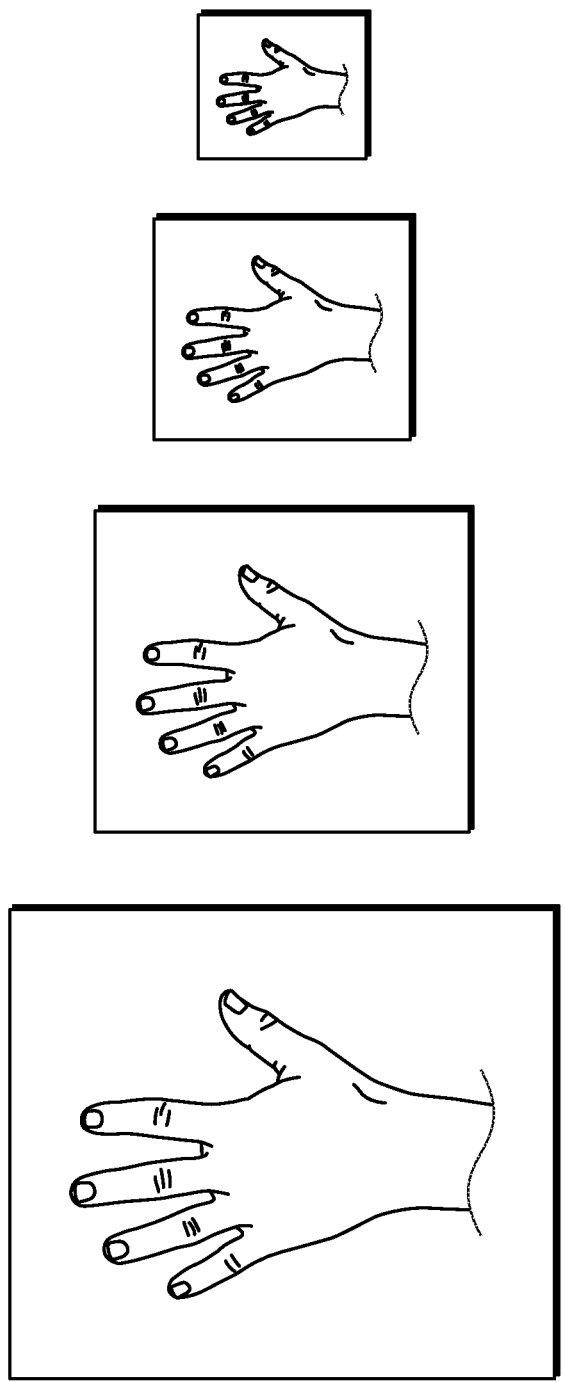
FIG. 2 is a schematic diagram illustrating hand detection at different scales, according to an implementation of the present application.

In S101, hand detection usually needs to be performed from the first frame of image. A specific detection method can be scanning holistically each frame of image and performing hand detection by using a HOG+SVM method. The HOG+SVM method is a human detection method commonly used in the existing technology, and details are omitted for simplicity. In addition, in the present application, hand detection needs to be performed at different scales, so as to make a good match with a hand in a frame of image, and accurately and quickly detect the hand. For different scales, references can be made to FIG. 2.

After hand detection succeeds (i. e. a hand is detected in a frame of image), location tracking can be performed on the detected hand. In an implementation, location tracking can be performed on the detected hand by using a template matching method to obtain a tracking result.

The tracking result is a preliminary tracking result, and whether tracking is valid cannot be determined based on the preliminary tracking result. Therefore, the tracking result needs to be verified.

Figure 3:
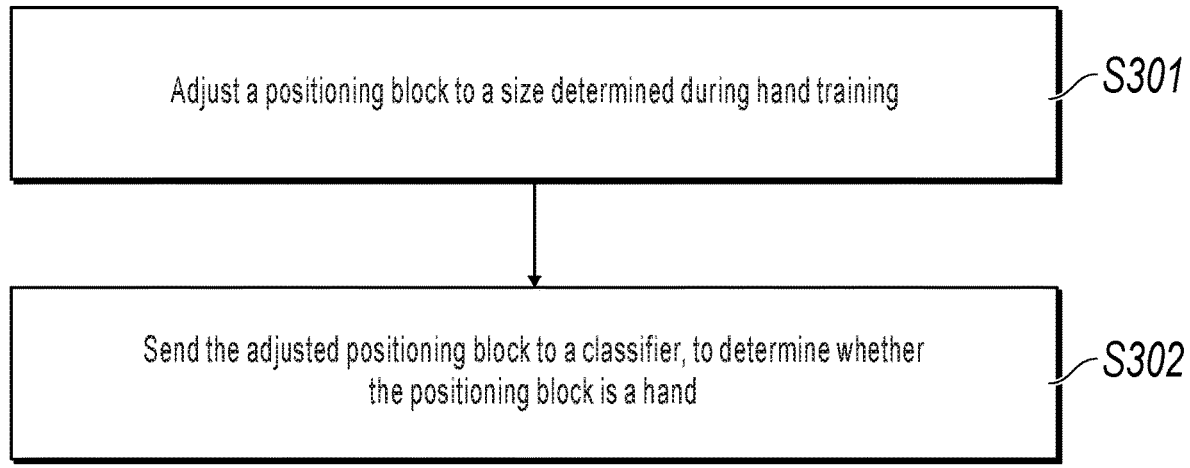
FIG. 3 is a flowchart illustrating a tracking result verification method, according to an implementation of the present application.

The tracking result usually corresponds to a positioning block in the frame of image. Verifying whether the tracking result is valid is determining whether the block is a hand. As shown in FIG. 3, a method for verifying whether the tracking result is valid includes the following steps:

S301. Adjust a positioning block to a size determined during hand training. A classifier needs to be trained before classification. Because the classifier has a fixed size during training, before classification, a hand block in a video needs to be adjusted to the size determined during hand training.

S302. Send the adjusted positioning block to a classifier, to determine whether the positioning block is a hand, where the tracking result is valid if the positioning block is a hand; otherwise, the tracking result is invalid.

Figure 4:
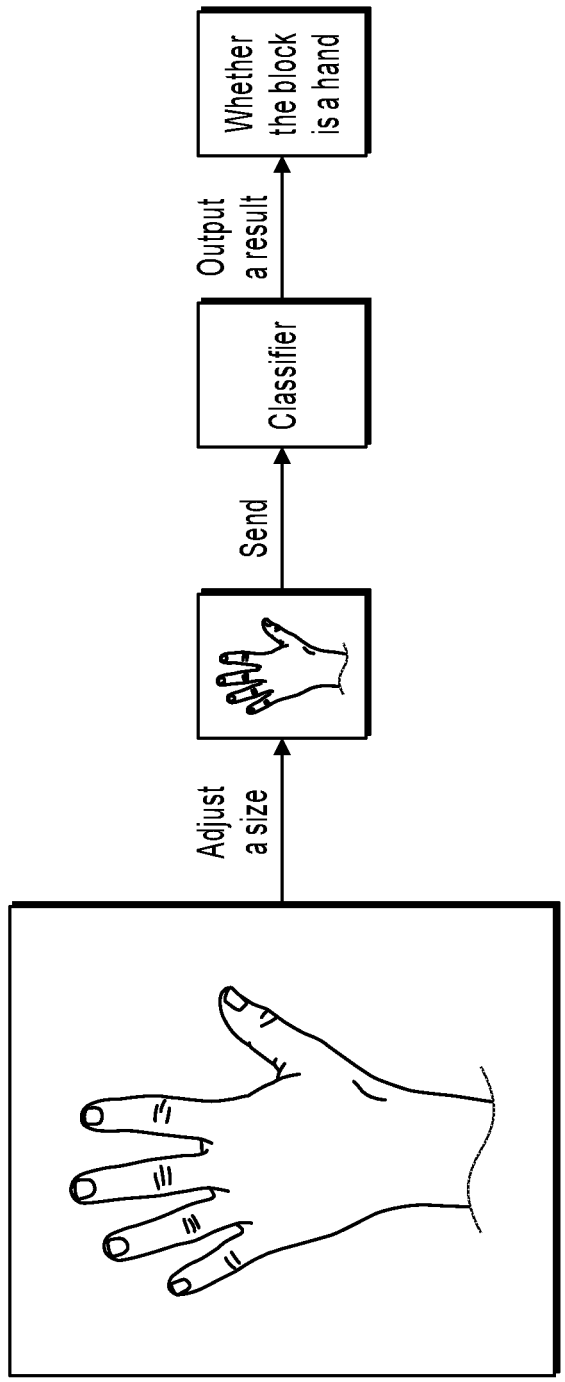
FIG. 4 is a schematic diagram illustrating a tracking result verification process, according to an implementation of the present application.

FIG. 4 is a schematic diagram illustrating a tracking result verification process, according to an implementation of the present application. As shown in FIG. 4, a hand block (positioning block S1) in a video first needs to be adjusted to the size determined during hand training, to obtain block S2, and then block S2 is sent to a classifier. The classifier can output a determining result, and whether block S2 is a hand can be determined based on the determining result. The tracking result is valid if block S2 is a hand; otherwise, the tracking result is invalid. The classifier can be an SVM classifier, an ANN classifier, a boost classifier, etc. The present application is not limited thereto.

When the tracking result is valid, tracking can be performed in a next frame, to be specific, S102 and S103 in FIG. 1 are repeatedly performed without performing hand detection in S101. Therefore, workloads are reduced in this method compared with the existing technology in which hand detection is performed in each frame of image.

Figure 5:
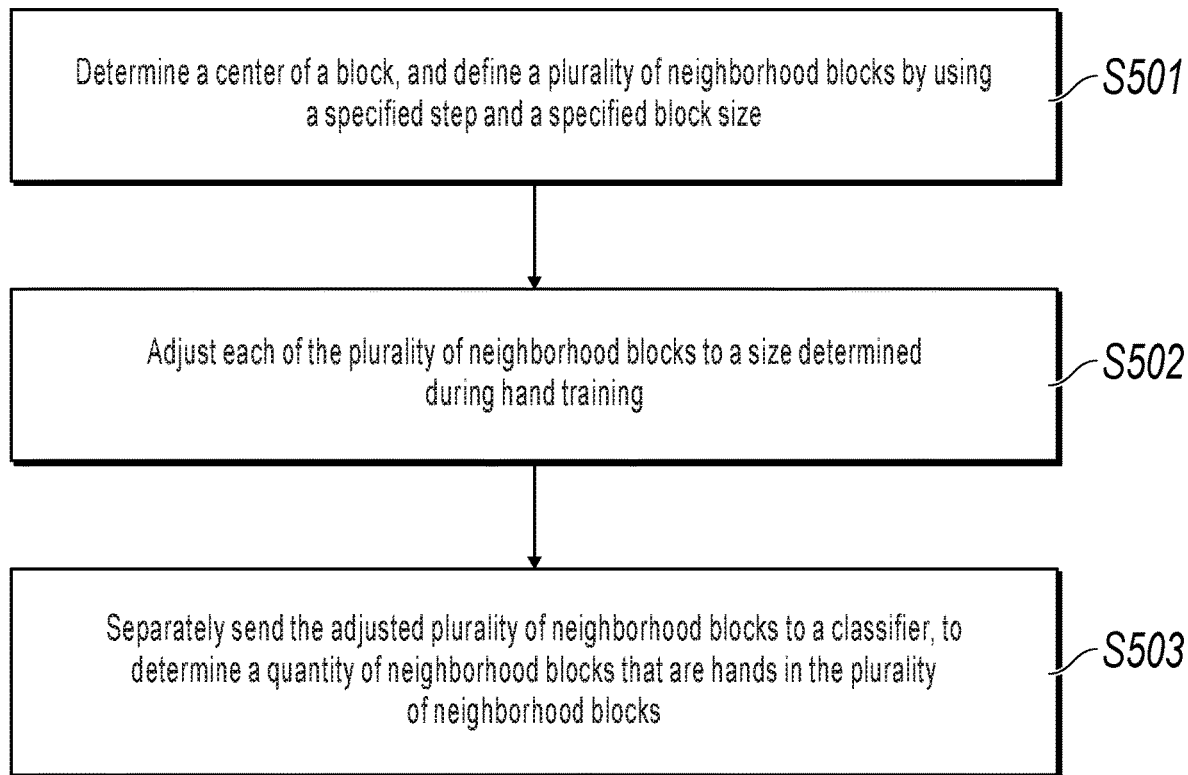
FIG. 5 is a flowchart illustrating a method for performing localized hand detection in a current frame based on a tracking result, according to an implementation of the present application.

However, when the tracking result is valid, a reason can be that the tracking result is deviated from the position and the size of the hand in the image. If hand detection in S101 is directly performed, an erroneous decision can be made. To solve the problem, as shown in FIG. 5, localized hand detection can be performed in the current frame based on the tracking result. Specifically, the following steps are included:

S501. Determine a center of the block, and define a plurality of neighborhood blocks by using a specified step and a specified block size.

S502. Adjust each of the plurality of neighborhood blocks to the size determined during hand training. A classifier needs to be trained before classification. Because the classifier has a fixed size during training, before classification, a hand block in a video needs to be adjusted to the size determined during hand training.

S503. Separately send the adjusted plurality of neighborhood blocks to the classifier, to determine a quantity of neighborhood blocks that are hands in the plurality of neighborhood blocks.

Specifically, the center of the block in the current tracking result can be defined as (x, y), and a height of the block is (w, h). Based on the previous description, if it is determined that the block is not a hand, a reason can be that the tracking result is slightly deviated from a real position or that a hand is zoomed during imaging due to a photographing distance. Therefore, in the present application, the following method is used to solve the problem. For clear description, in the following method, the specified step is set to 2, the quantity of neighborhood blocks is set to 8, and the specified block size includes three sizes: (0.8 w, 0.8 h), (w, h), (1.2 w, 1.2 h). The settings are not used as a limitation.

Hand detection is first performed in the eight neighborhood blocks with a step of 2 at (x, y), to be specific, centers of the eight neighborhood blocks to be determined are respectively (x−2, y−2), (x, y−2), (x+2, y−2), (x, y−2), (x, y+2), (x+2, y−2), (x+2, y), (x+2, y+2). After the three sizes of (0.8 w, 0.8 h), (w, h), and (1.2 w, 1.2 h) are set, the quantity of neighborhood blocks is equivalent to 3×8=24. Different block sizes are intended to cover the impact of zooming.

After the previous operation is completed, hand determining can be separately performed for the 24 neighborhood blocks. Each neighborhood block is first adjusted to the size determined during hand training. Then the adjusted neighborhood blocks are separately sent to the classifier, to determine whether each neighborhood block is a hand. The quantity of neighborhood blocks that are hands is finally counted. In the method, an adjust operation and a determining operation of the classifier need to be performed for 3×8 times. Therefore, a calculation amount can be greatly reduced in this method compared with the existing technology in which a detection operation is performed in each frame.

Further actions can be performed based on the counted quantity of neighborhood blocks that are hands. Details are as follows:

If the quantity of neighborhood blocks that are hands in the 24 neighborhood blocks is greater than or equal to 2, all neighborhood blocks that are hands can be combined to output a final tracking result, and then tracking is performed in a next frame. To be specific, S102 and S103 in FIG. 1 are repeatedly performed without performing hand detection in S101.

Figure 6:
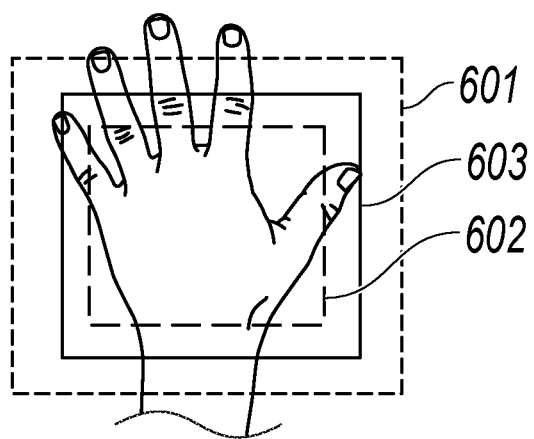
FIG. 6 is a schematic diagram illustrating a block combination, according to an implementation of the present application.

Assume that the quantity of neighborhood blocks that are hands in the 24 neighborhood blocks is equal to 2. As shown in FIG. 6, two dashed blocks (block 601 and block 602) are detected blocks. A result for block 601 is (left1, top1, right1, bottom1), where (left1, top1) identifies coordinates of an upper left vertex of block 601, and (right1, bottom1) identifies coordinates of a lower right vertex of block 601. A result for block 602 is (left2, top2, right2, bottom2), where (left2, top2) identifies coordinates of an upper left vertex of block 602, and (right2, bottom2) identifies coordinates of a lower right vertex of block 602. Block 601 and block 602 are combined to obtain block 603, and a result for block 603 is ((left1+left2)/2, (top1+top2)/2, (right1+right2)/2, (bottom1+bottom2)/2), and the result (block 603) obtained after the combination is output as the final tracking result.

A case in which the quantity of neighborhood blocks that are hands in the 24 neighborhood blocks is greater than or equal to 2 is equivalent to performing a hand detection operation in a limited area and outputting a detection result.

If only one of the 24 neighborhood blocks is a hand, the neighborhood block that is a hand is combined with the positioning block obtained in S102, and a result obtained after the combination is used as the final tracking result, and then tracking is performed in a next frame, to be specific, S102 and S103 in FIG. 1 are repeatedly performed without performing hand detection in S101.

Figure 7:
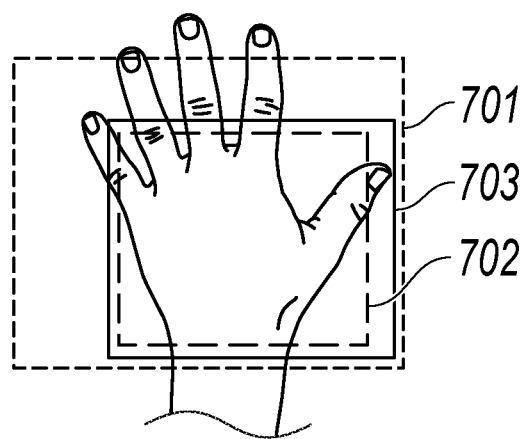
FIG. 7 is a schematic diagram illustrating a block combination, according to another implementation of the present application.

Assume that the classifier determines that only one of the 24 neighborhood blocks is a hand. As shown in FIG. 7, block 701 is a detected block, and a result for block 701 is (left3, top3, right3, bottom3), where (left3, top3) identifies coordinates of an upper left vertex of block 701, and (right3, bottom3) identifies coordinates of a lower right vertex of block 701. Block 702 is a block obtained in S102, and a result for block 702 is (left4, top4, right4, bottom4), where (left4, top4) identifies coordinates of an upper left vertex of block 702, and (right4, bottom4) identifies coordinates of a lower right vertex of block 702. Block 701 and block 702 are combined to obtain block 703, and a result for block 703 is ((left3+left4)/2, (top3+top4)/2, (right3+right4)/2, (bottom3+bottom4)/2), and the result (block 703) obtained after the combination is output as the final tracking result.

The previous case in which only one of the 24 neighborhood blocks is a hand can be understood as follows: Both tracking and detection are valid, but the tracking result is only slightly deviated from a real position, and this problem can be solved through combination.

If no neighborhood block in the 24 neighborhood blocks is a hand, a reason can be that the hand no longer exists or that a hand pattern is much different from a pattern defined during training. In this case, hand detection is performed in each frame of image again.

According to the hand detection and tracking method in this implementation of the present application, validity of the tracking result is verified, and an invalid tracking result can be corrected, to avoid making an erroneous decision. Therefore, hand detection can be performed quickly and accurately. Localized hand detection is performed in the current frame based on the tracking result, so that a calculation amount can be greatly reduced.

Based on an inventive concept the same as that of the hand detection and tracking method, the present application provides a hand detection and tracking device, as described in the following implementation. Because a principle used by the hand detection and tracking device to solve a problem is similar to that used in the hand detection and tracking method, for implementation of the hand detection and tracking device, references can be made to the implementation of the hand detection and tracking method, and repeated parts are omitted for simplicity.

Figure 8:
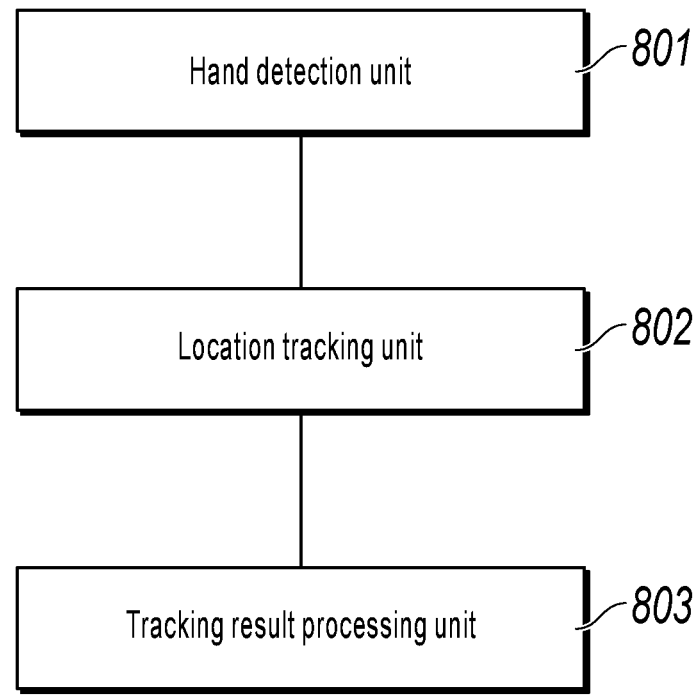
FIG. 8 is a schematic structural diagram illustrating a hand detection and tracking device, according to an implementation of the present application.

FIG. 8 is a schematic structural diagram illustrating a hand detection and tracking device, according to an implementation of the present application. As shown in FIG. 8, the hand detection and tracking device includes a hand detection unit 801, a location tracking unit 802, and a tracking result processing unit 803.

The hand detection unit 801 is configured to perform hand detection in each frame of image.

The location tracking unit 802 is configured to perform location tracking on a detected hand to obtain a tracking result when the hand is detected in a frame of image.

The tracking result processing unit 803 is configured to verify whether the tracking result is valid, to track the hand in a next frame or perform localized hand detection in the current frame based on the tracking result.

In an implementation, the hand detection unit 801 is specifically configured to holistically scan a frame of image, and perform hand detection by using a HOG+SVM method at different scales. In addition, in the present application, hand detection needs to be performed at different scales, so as to make a good match with a hand in a frame of image, and accurately and quickly detect the hand.

In an implementation, the location tracking unit 802 is specifically configured to perform location tracking on the detected hand by using a template matching method to obtain the tracking result.

Figure 9:
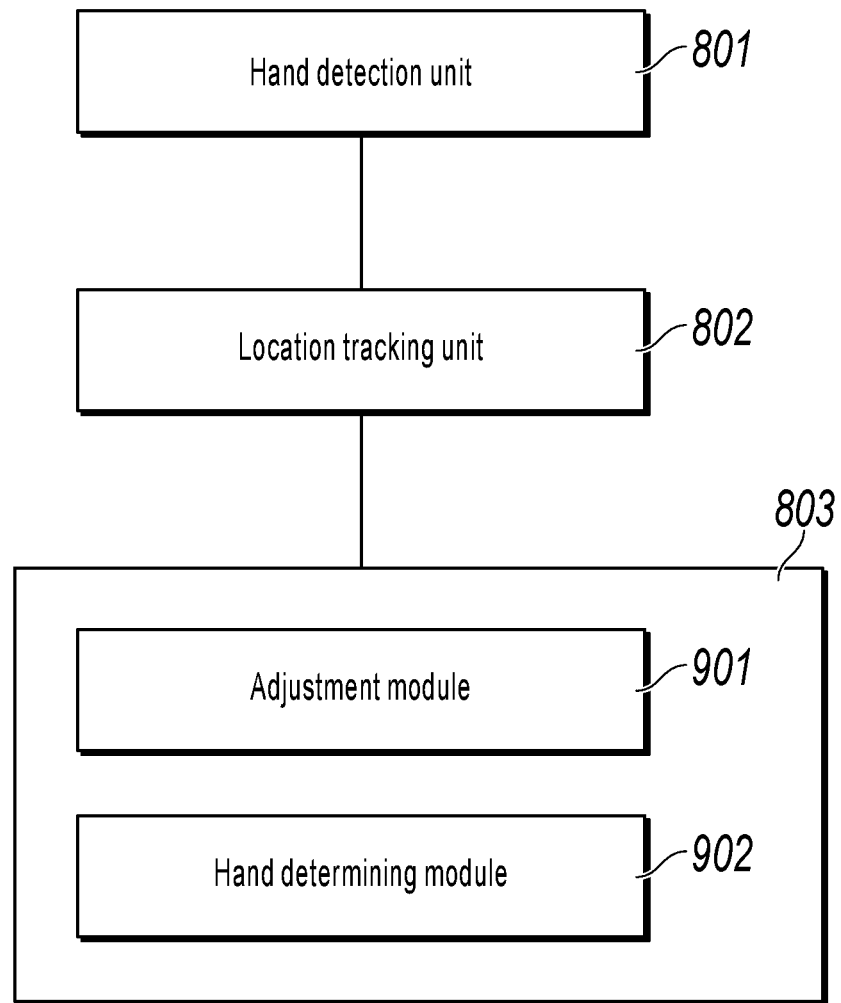
FIG. 9 is a schematic structural diagram illustrating a tracking result processing unit, according to an implementation of the present application.

In an implementation, as shown in FIG. 9, the tracking result processing unit includes an adjustment module 901 and a hand determining module 902.

The adjustment module 901 is configured to adjust a positioning block to a size determined during hand training. A classifier needs to be trained before classification. Because the classifier has a fixed size during training, before classification, a hand block in a video needs to be adjusted to the size determined during hand training.

The hand determining module 902 is configured to send the adjusted positioning block to a classifier, to determine whether the positioning block is a hand, where the tracking result is valid if the positioning block is a hand; otherwise, the tracking result is invalid.

In an implementation, if the hand determining module 902 determines that the tracking result is valid, the location tracking unit 802 tracks the hand in the next frame.

Figure 10:
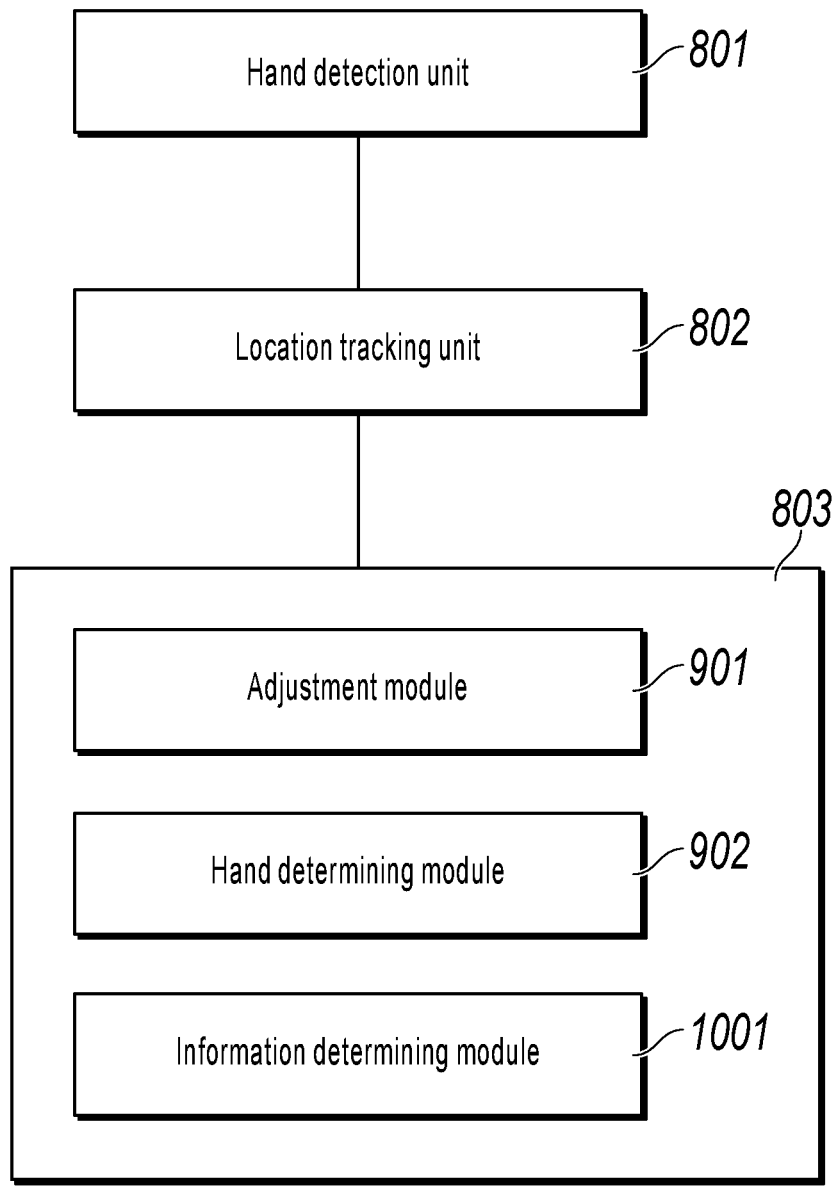
FIG. 10 is a schematic structural diagram illustrating a tracking result processing unit, according to another implementation of the present application.

In an implementation, as shown in FIG. 10, the tracking result processing unit 803 further includes an information determining module 1001, configured to determine a center of the positioning block, and define a plurality of neighborhood blocks by using a specified step and a specified block size. The adjustment module 901 adjusts each of the plurality of neighborhood blocks to the size determined during hand training. The hand determining module 902 separately sends the adjusted plurality of neighborhood blocks to the classifier, to determine a quantity of neighborhood blocks that are hands in the plurality of neighborhood blocks.

Figure 11:
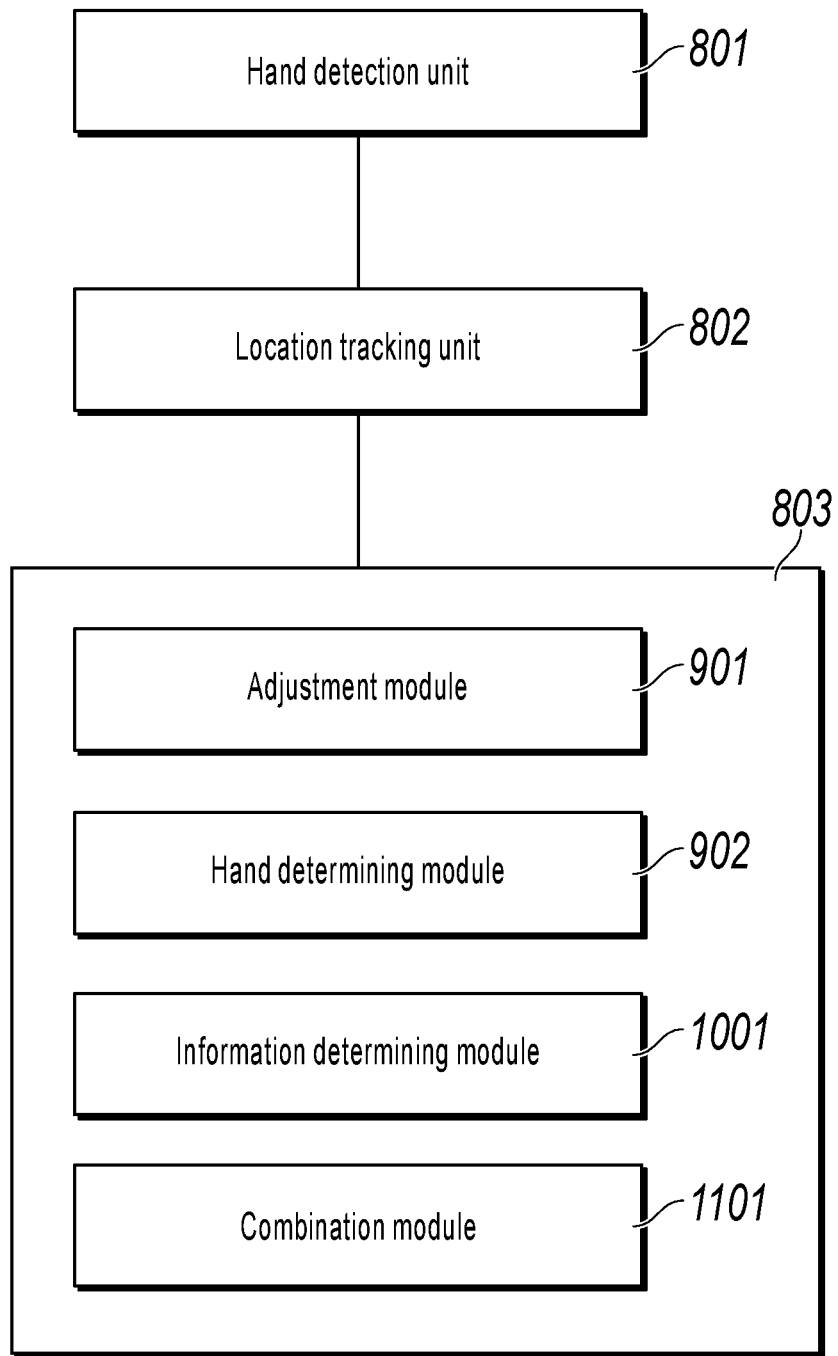
FIG. 11 is a schematic structural diagram illustrating a tracking result processing unit, according to still another implementation of the present application.

In an implementation, as shown in FIG. 11, the tracking result processing unit 803 further includes a combination module 1101, configured to combine all neighborhood blocks that are hands to output a final tracking result, and then perform tracking in the next frame, when the quantity of neighborhood blocks that are hands in the plurality of neighborhood blocks is greater than or equal to 2.

In an implementation, if the quantity of neighborhood blocks that are hands in the plurality of neighborhood blocks is 1, the combination module 1101 is further configured to combine a neighborhood block that is a hand with the positioning block to output a final tracking result, and then perform tracking in the next frame.

In an implementation, if no neighborhood block in the plurality of neighborhood blocks is a hand, the hand detection unit 801 needs to perform hand detection in each frame of image again.

According to the hand detection and tracking device in this implementation of the present application, validity of the tracking result is verified, and an invalid tracking result can be corrected, to avoid making an erroneous decision. Therefore, hand detection can be performed quickly and accurately. Localized hand detection is performed in the current frame based on the tracking result, so that a calculation amount can be greatly reduced.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product according to the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specified function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specified function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Specific implementations are used in the present disclosure to describe the principles and implementations of the present disclosure. The previous implementations are merely intended to help understand the method and the core idea of the present disclosure. In addition, a person of ordinary skill in the art can make a change to a specific implementation and an application scope based on the idea of the present disclosure. In conclusion, the content of the present specification shall not be construed as a limitation to the present disclosure.

Figure 12:
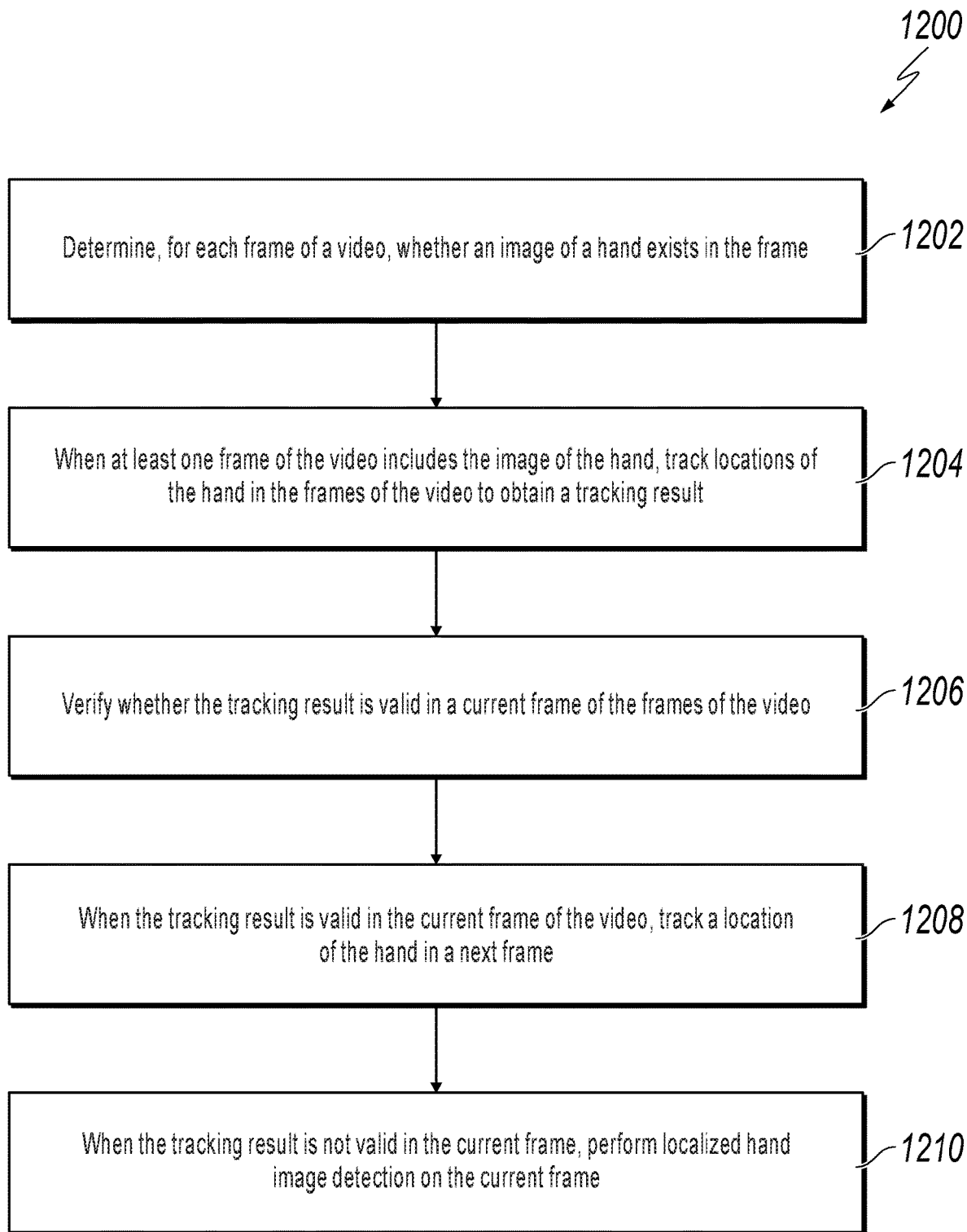
FIG. 12 is a flowchart illustrating an example of a computer-implemented method for tracking images of a hand from frame-to-frame in a video, according to an implementation of the present disclosure.

FIG. 12 is a flowchart illustrating an example of a computer-implemented method 1200 for tracking images of a hand from frame-to-frame in a video, according to an implementation of the present disclosure. For clarity of presentation, the description that follows generally describes method 1200 in the context of the other figures in this description. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

At 1202, for each frame of a video, a determination is made whether an image of a hand exists in the frame. As an example, the hand detection unit 801 can perform hand image detection in each frame of the a video.

In some implementations, determining whether the image of the hand exists in the frame can include using scans of each frame of the video. For example, the frame can be scanned to produce scans that detect a presence of the image of the hand. Using the scans, hand image detection can be performed by using a combination of histogram of oriented gradients (HOG) and support vector machines (SVM) methods at different scales.

In some implementations, determining whether the image of the hand exists at the location in the frame can include determining whether an image of the hand exists in subimages. For example, coordinates of a positioning block can be determined that are used to identify a location of the image of the hand in the frame. The positioning block can be adjusted to a size determined during a hand training, for example, determining a size of a block that is likely to result in determining the presence of a hand, based on the size of the hand. A sub-image that is determined by the adjusted positioning block can be provided to an image object classifier that is configured to determine whether the sub-image is a hand. An indication can be received from the image object classifier that indicates whether the sub-image determined by the adjusted positioning block identifies the hand. The image object classifier can otherwise provide a result that indicates that the image of the hand has not been found.

In some implementations, performing localized hand image detection on the current frame can use positioning blocks and adjacent blocks to detect the hand image. For example, a center of the positioning block can be determined. A plurality of adjacent blocks can be defined by using a specified step and a specified block size. Each of the plurality of adjacent blocks can be adjusted to a size determined during a hand training. Each adjusted adjacent block can be provided to the image object classifier that can determine a quantity of the plurality of adjacent blocks that include images of hands.

In some implementations, when the quantity of the plurality of adjacent blocks that include images of hands is two or more, each of the adjacent blocks can be used for subsequent tracking. For example, the hand image can be split between the two adjacent blocks, and the combined location can be used in tracking.

In some implementations, when the quantity of the plurality of adjacent blocks that include images of hands is one, a combination of the adjacent block can be used with the positioning block for subsequent tracking. For example, the tracking of the hand can be based on the location of the hand image in the single adjacent block.

In some implementations, when the quantity of the plurality of adjacent blocks that include images of hands is zero, additional hand image detection is performed. As an example, if none of the adjacent blocks are determined to contain the image of the hand, image detection can be extended to additional blocks, such as blocks that are adjacent to a first round of adjacent blocks. From 1202, method 1200 proceeds to 1204.

At 1204, when at least one frame of the video includes the image of the hand, locations of the hand in the frames of the video are tracked to obtain a tracking result. For example, tracking the location of the hand in a subsequent frame can occur when a current frame is determined to include the image of the hand. Location tracking can be performed, for example, by the location tracking unit 802

In some implementations, tracking the locations of the hand in the frames of the video to obtain the tracking result comprises using a template matching method to obtain the tracking result. The template matching method can be based on a template determined from a location of the image of the hand in the frame. As an example, the location tracking unit 802 can generate a template that includes a location of the image of the hand in a frame. The template can be used, in subsequent frames, to concentrate location tracking of the image of the hand in a particular region of the frame. From 1204, method 1200 proceeds to 1206.

At 1206, a verification is performed to determine whether the tracking result is valid in a current frame of the frames of the video. For example, the tracking result processing unit 803 can verify whether the tracking result is valid. From 1206, method 1200 proceeds to 1208.

At 1208, when the tracking result is valid in the current frame of the video, a location of the hand is tracked in a next frame. As an example, tracking of the hand can continue in the next frame, such as using a template associated with the location of the image of the hand in the current frame. From 1208, method 1200 proceeds to 1210.

At 1210, when the tracking result is not valid in the current frame, localized hand image detection is performed on the current frame. For example, additional hand image detection can occur in order to locate the image of the hand in the current frame. After 1210, method 1200 stops.

Techniques described in the present disclosure can be used to track images of a hand from frame-to-frame in a video. The tracking can be improved through the use of templates that are based on the location of the image of the hand in the current frame, with the templates being used in a subsequent frame. The tracking can also be improved using localized tracking that involves detection of the image of the hand in adjacent blocks. A tracking verification mechanism can be used to produce a tracking result that can be determined and corrected in real time, which can help to ensure quick and accurate hand detection.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method, comprising:
   determining, for each frame of a video, whether an image of a hand exists in the frame;
   when at least one frame of the video includes the image of the hand, tracking locations of the hand in the frames of the video to obtain a tracking result;
   verifying that the tracking result is not valid in a current frame of the frames of the video, and
   performing localized hand image detection on the current frame by:
      determining a center of a positioning block used to identify a location of the image of the hand in the frame,
      defining a plurality of adjacent blocks by using a specified step size and a specified block size,
      adjusting each of the plurality of adjacent blocks to a size determined during a hand training, and
      providing, to an image object classifier, each adjusted adjacent block to determine a quantity of the plurality of adjacent blocks that include images of hands.

2. The computer-implemented method of claim 1, wherein determining whether the image of the hand exists in the frame comprises:
   scanning the frame to detect a presence of the image of the hand to produce scans; and
   performing, using the scans, hand image detection by using a histogram of oriented gradients (HOG)+support vector machines (SVM) method at different scales.

3. The computer-implemented method of claim 1, wherein tracking the locations of the hand in the frames of the video to obtain the tracking result comprises using a template matching method to obtain the tracking result, the template matching method based on a template determined from a location of the image of the hand in the frame.

4. The computer-implemented method of claim 1, wherein, when the quantity of the plurality of adjacent blocks that include images of hands is two or more, using each of the adjacent blocks for subsequent tracking.

5. The computer-implemented method of claim 1, wherein, when the quantity of the plurality of adjacent blocks that include images of hands is one, using a combination of the adjacent block with the positioning block for subsequent tracking.

6. The computer-implemented method of claim 1, wherein, when the quantity of the plurality of adjacent blocks that include images of hands is zero, performing additional hand image detection.

7. A non-transitory, computer-readable medium storing one or more instructions executable by a computer system to perform operations comprising:
 determining, for each frame of a video, whether an image of a hand exists in the frame;
 when at least one frame of the video includes the image of the hand, tracking locations of the hand in the frames of the video to obtain a tracking result;
 verifying that the tracking result is not valid in a current frame of the frames of the video, and
 performing localized hand image detection on the current frame by:
  determining a center of a positioning block used to identify a location of the image of the hand in the frame,
  defining a plurality of adjacent blocks by using a specified step size and a specified block size,
  adjusting each of the plurality of adjacent blocks to a size determined during a hand training, and
  providing, to an image object classifier, each adjusted adjacent block to determine a quantity of the plurality of adjacent blocks that include images of hands.

8. The non-transitory, computer-readable medium of claim 7, wherein determining whether the image of the hand exists in the frame comprises:
 scanning the frame to detect a presence of the image of the hand to produce scans; and
 performing, using the scans, hand image detection by using a histogram of oriented gradients (HOG)+support vector machines (SVM) method at different scales.

9. The non-transitory, computer-readable medium of claim 7, wherein tracking the locations of the hand in the frames of the video to obtain the tracking result comprises using a template matching method to obtain the tracking result, the template matching method based on a template determined from a location of the image of the hand in the frame.

10. The non-transitory, computer-readable medium of claim 7, wherein, when the quantity of the plurality of adjacent blocks that include images of hands is two or more, using each of the adjacent blocks for subsequent tracking.

11. The non-transitory, computer-readable medium of claim 7, wherein, when the quantity of the plurality of adjacent blocks that include images of hands is one, using a combination of the adjacent block with the positioning block for subsequent tracking.

12. The non-transitory, computer-readable medium of claim 7, wherein, when the quantity of the plurality of adjacent blocks that include images of hands is zero, performing additional hand image detection.

13. A computer-implemented system, comprising:
 one or more computers; and
 one or more computer memory devices interoperably coupled with the one or more computers and having tangible, non-transitory, machine-readable media storing one or more instructions that, when executed by the one or more computers, perform one or more operations comprising:
  determining, for each frame of a video, whether an image of a hand exists in the frame;
  when at least one frame of the video includes the image of the hand, tracking locations of the hand in the frames of the video to obtain a tracking result;
  verifying that the tracking result is not valid in a current frame of the frames of the video, and
  when the tracking result is valid in the current frame of the video, tracking a location of the hand in a next frame; and
  when the tracking result is not valid in the current frame, performing localized hand image detection on the current frame by:
   determining a center of a positioning block used to identify a location of the image of the hand in the frame,
   defining a plurality of adjacent blocks by using a specified step size and a specified block size,
   adjusting each of the plurality of adjacent blocks to a size determined during a hand training, and
   providing, to an image object classifier, each adjusted adjacent block to determine a quantity of the plurality of adjacent blocks that include images of hands.

14. The computer-implemented system of claim 13, wherein determining whether the image of the hand exists in the frame comprises:
 scanning the frame to detect a presence of the image of the hand to produce scans; and
 performing, using the scans, hand image detection by using a histogram of oriented gradients (HOG)+support vector machines (SVM) method at different scales.

15. The computer-implemented system of claim 13, wherein tracking the locations of the hand in the frames of the video to obtain the tracking result comprises operations of using a template matching method to obtain the tracking result, the template matching method based on a template determined from a location of the image of the hand in the frame.

16. The computer-implemented system of claim 13, wherein:
 when a quantity of the plurality of adjacent blocks that include images of hands is two or more, using each of the adjacent blocks for subsequent tracking;
 when a quantity of the plurality of adjacent blocks that include images of hands is one, using a combination of the adjacent block with the positioning block for subsequent tracking; and
 when a quantity of the plurality of adjacent blocks that include images of hands is zero, performing additional hand image detection.

* * * * *